(12) United States Patent
Yokoi

(10) Patent No.: US 6,934,404 B2
(45) Date of Patent: Aug. 23, 2005

(54) STAMP DETECTING DEVICE, STAMP DETECTING METHOD, LETTER PROCESSING APPARATUS AND LETTER PROCESSING METHOD

(75) Inventor: Kentaro Yokoi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 09/955,143

(22) Filed: Sep. 19, 2001

(65) Prior Publication Data

US 2002/0046663 A1 Apr. 25, 2002

(30) Foreign Application Priority Data

Sep. 20, 2000 (JP) ........................................ 2000-286026

(51) Int. Cl.$^7$ ................................................. G06K 9/00
(52) U.S. Cl. ..................................................... 382/101
(58) Field of Search ................................ 382/101, 135, 382/136, 137, 138, 171, 172, 174, 289, 294, 296, 297, 209, 217, 218; 705/62, 401, 406, 410; 209/584

(56) References Cited

U.S. PATENT DOCUMENTS

| | | | | |
|---|---|---|---|---|
| 4,998,626 A | * | 3/1991 | Ota | 382/102 |
| 5,025,475 A | * | 6/1991 | Okabe | 382/101 |
| 5,535,127 A | * | 7/1996 | Uno et al. | 705/406 |
| 5,537,491 A | * | 7/1996 | Mahoney et al. | 382/218 |
| 5,926,564 A | * | 7/1999 | Kimura | 382/170 |
| 6,047,085 A | * | 4/2000 | Sato et al. | 382/165 |
| 6,151,423 A | * | 11/2000 | Melen | 382/289 |
| 6,222,940 B1 | * | 4/2001 | Wenzel et al. | 382/217 |

FOREIGN PATENT DOCUMENTS

| | | |
|---|---|---|
| JP | 62-138983 | 6/1987 |
| JP | 3-220679 | 9/1991 |

* cited by examiner

*Primary Examiner*—Jon Chang
*Assistant Examiner*—A. Upreti
(74) *Attorney, Agent, or Firm*—Pillsbury Winthrop Shaw Pittman LLP

(57) ABSTRACT

An image input section inputs an image of a letter P and stores the same into an image memory. A stamp detecting section detects a stamp by a luminance projection value based on the image of the letter stored in the image memory, determining that an area is not an external area of the stamp and determining the area as an internal area of the stamp if the length of the area is smaller than a stamp internal gap permissible threshold value used for determining a stamp internal gap even in a case where the area which is partly determined as an external area of the stamp is present in an area which is determined as the internal area of the stamp affixed to the letter P based on the thus derived projection value.

19 Claims, 13 Drawing Sheets

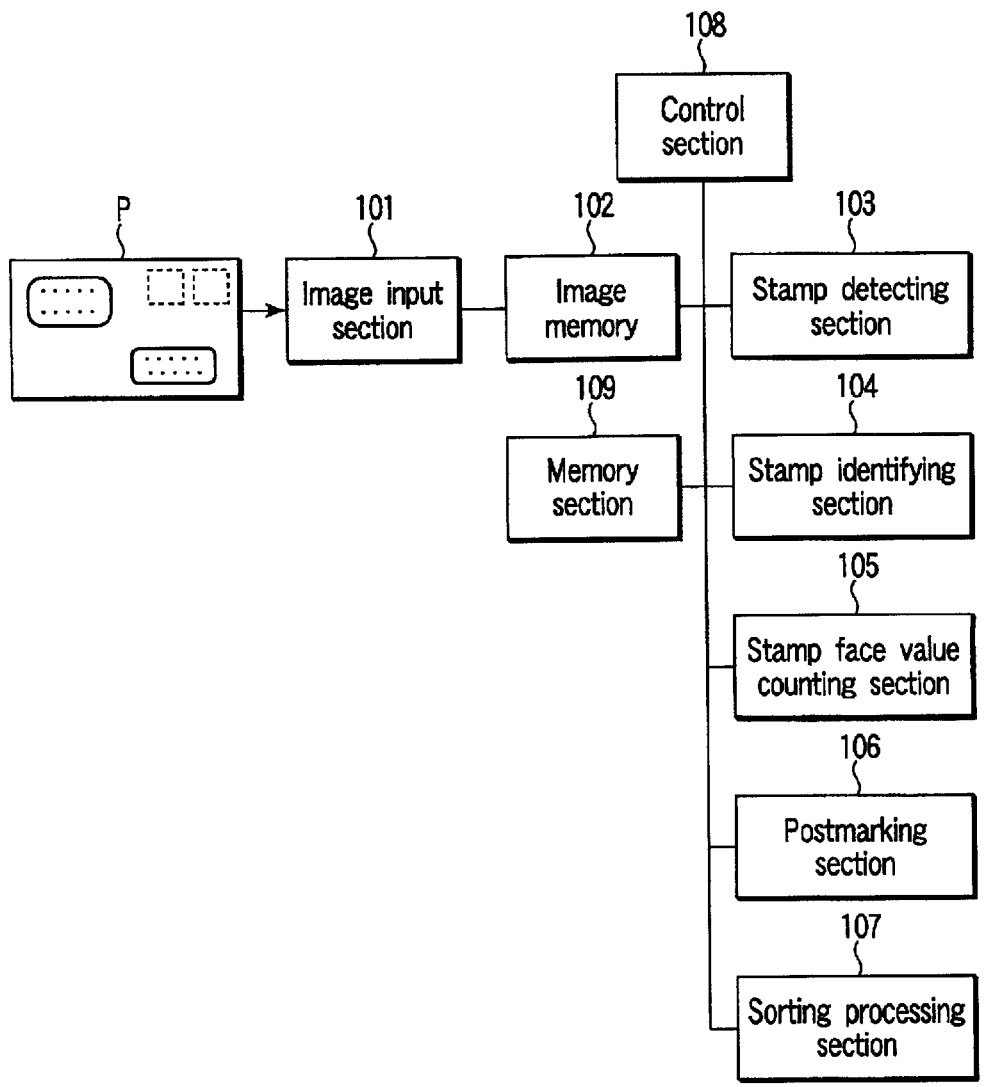
F I G. 1

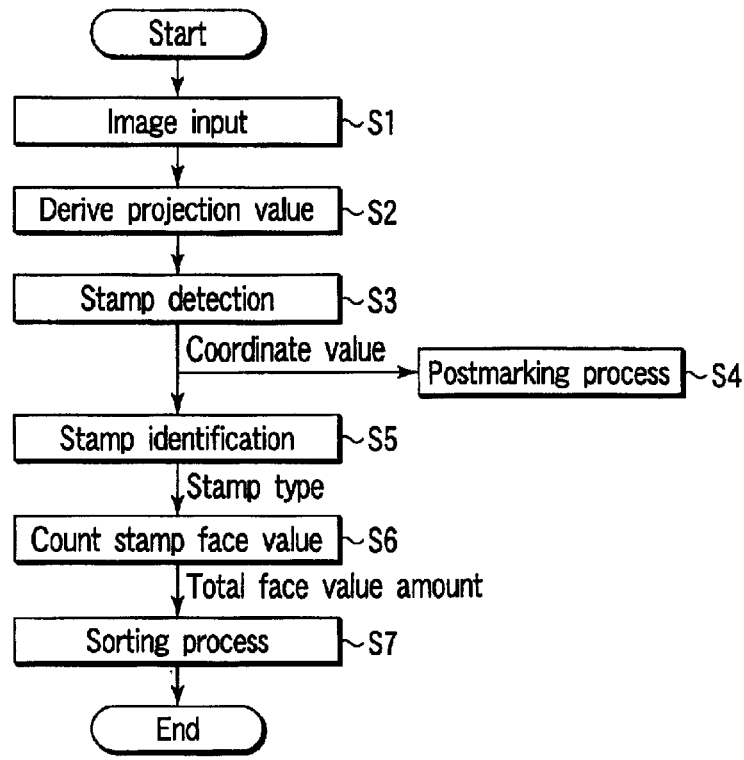
F I G. 2
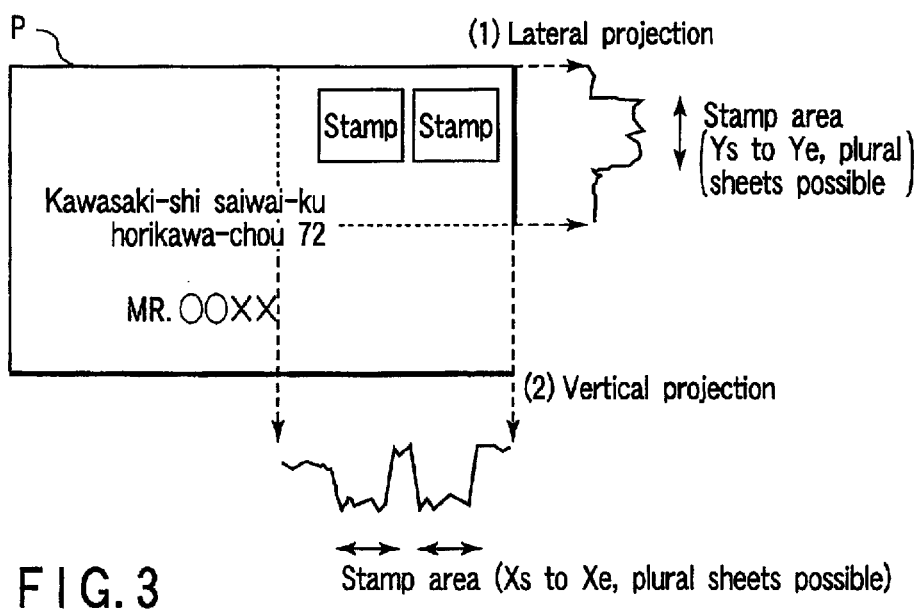
F I G. 3

| Type | Amount |
|------|--------|
| A | 60 yen |
| B | 80 yen |
| C | 120 yen |
| ⋮ | ⋮ |

~109a

| Type | Noticed area for specific identification |
|---|---|
| A | (100, 150)~(120, 180) |
| B | (10, 30)~(50, 80) |
| C | (10, 150)~(60, 190) |
| ⋮ | ⋮ |

~109b

| Type | Amount | ~109C |
|---|---|---|
| Ordinary mail A | 60 yen | |
| Ordinary mail B | 100 yen | |
| Ordinary mail C | 260 yen | |
| Ordinary mail D | 380 yen | |
| ⋮ | ⋮ | |

STAMP DETECTING DEVICE, STAMP DETECTING METHOD, LETTER PROCESSING APPARATUS AND LETTER PROCESSING METHOD

CROSS-REFERENCE TO RELATED APPLICATIONS

This application is based upon and claims the benefit of priority from the prior Japanese Patent Application No. 2000-286026, filed Sep. 20, 2000, the entire contents of which are incorporated herein by reference.

BACKGROUND OF THE INVENTION

1. Field of the Invention

This invention relates to a stamp detecting device, stamp detecting method, letter processing apparatus and letter processing method for detecting a stamp affixed to a postal letter, for example.

2. Description of the Related Art

Further, this invention relates to a letter processing apparatus and letter processing method for sorting a postal letter by use of the above stamp detecting device.

In a stamp detecting device, as various threshold values (for example, a threshold value used for distinguishing the stamp area and the ground area of the letter) used for detecting a stamp affixed to a postal letter, predetermined values or values derived by a statistical calculation based on an image of the letter are used when the stamp is detected based on a density projection value.

Further, when the type of stamp affixed to the postal letter is identified, the identification method which is not influenced by the affixed orientation of the stamp is used. Also, when the type of stamp affixed to the postal letter is identified, the identification method is effected without using knowledge of the face value of the stamp.

However, in the above conventional methods, it is difficult to adequately set the threshold value used for detection of the stamp and if the threshold value is not adequately set, it fails to correctly detect the stamp in some cases.

Further, the identification method which does not depend on the affixed orientation of the stamp has a problem that the identification performance is lower than that of the identification method which depends on the affixed orientation of the stamp. In addition, since it does not utilize the knowledge of the face value of the stamp, there occurs a problem that a lot of identification errors are made.

BRIEF SUMMARY OF THE INVENTION

Accordingly, an object of this invention is to provide a stamp detecting device, stamp detecting method, letter processing apparatus and letter processing method which makes it easy to set threshold values used for detecting a stamp and can always stably effect the stamp detecting operation.

Further, another object of this invention is to provide a stamp detecting device, stamp detecting method, letter processing apparatus and letter processing method capable of more precisely detecting a stamp.

A stamp detecting device according to one aspect of this invention comprises an image input section which inputs an image of a letter having at least one stamp affixed thereto; and a stamp detecting section which detects a stamp by determining a gap area as an internal area of the stamp if the size of the gap area is within a preset permissible range in a case where the gap area which is partly determined as an external area of the stamp is present in an area which is determined as the internal area of the stamp affixed to the letter based on the image input from the image input section.

A letter processing apparatus according to another aspect of this invention comprises an image input section which inputs an image of a letter having at least one stamp affixed thereto; a stamp detecting section which detects a stamp by determining a gap area as an internal area of the stamp if the size of the gap area is within a preset permissible range in a case where the gap area which is partly determined as an external area of the stamp is present in an area which is determined as the internal area of the stamp affixed to the letter based on the image input from the image input section; a stamp identifying section which identifies a type of the stamp detected by the stamp detecting section; a stamp face value calculating section which derives a total face value of the stamps affixed to the letter based on the type of the stamp identified by the stamp identifying section; and a sorting section which sorts the letter based on the total face value of the stamps derived by the stamp face value calculating section.

A letter processing apparatus according to still another aspect of this invention comprises an image input section which inputs an image of a letter having at least one stamp affixed thereto; a stamp detecting section which detects a stamp affixed to the letter based on a density or luminance projection value derived according to the image input by the image input section; a stamp identifying section which identifies a type of the stamp detected by the stamp detecting section; a stamp face value calculating section which derives a total face value of the stamps affixed to the letter based on the type of the stamp identified by the stamp identifying section; and a sorting section which sorts the letter based on the total face value of the stamps derived by the stamp face value calculating section.

A stamp detecting method according to another aspect of this invention comprises inputting an image of a letter having at least one stamp affixed thereto; and detecting a stamp by determining a gap area as an internal area of the stamp if the size of the gap area is within a preset permissible range in a case where the gap area which is partly determined as an external area of the stamp is present in an area which is determined as the internal area of the stamp affixed to the letter based on the image input in the image input step.

A letter processing method according to another aspect of this invention comprises inputting an image of a letter having at least one stamp affixed thereto; detecting a stamp by determining a gap area as an internal area of the stamp if the size of the gap area is within a preset permissible range in a case where the gap area which is partly determined as an external area of the stamp is present in an area which is determined as the internal area of the stamp affixed to the letter based on the image input in the image input step; identifying a type of the stamp detected in the stamp detecting step; deriving a total face value of the stamps affixed to the letter based on the type of the stamp identified in the identifying step; and sorting the letter based on the total face value of the stamps derived in the total face value deriving step.

A letter processing method according to still another aspect of this invention comprises inputting an image of a letter having at least one stamp affixed thereto; deriving a density projection value based on the input image; detecting a stamp affixed to the letter based on the thus derived projection value; identifying a type of the detected stamp;

deriving a total face value of the stamps affixed to the letter based on the type of the stamp thus identified; and sorting the letter based on the thus derived total face value of the stamps.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing the configuration of a letter processing apparatus according to a first embodiment of this invention;

FIG. 2 is a flowchart for illustrating a flow of the schematic process;

FIG. 3 is a view for schematically illustrating a stamp detecting process;

DETAILED DESCRIPTION OF THE INVENTION

Figure 4:
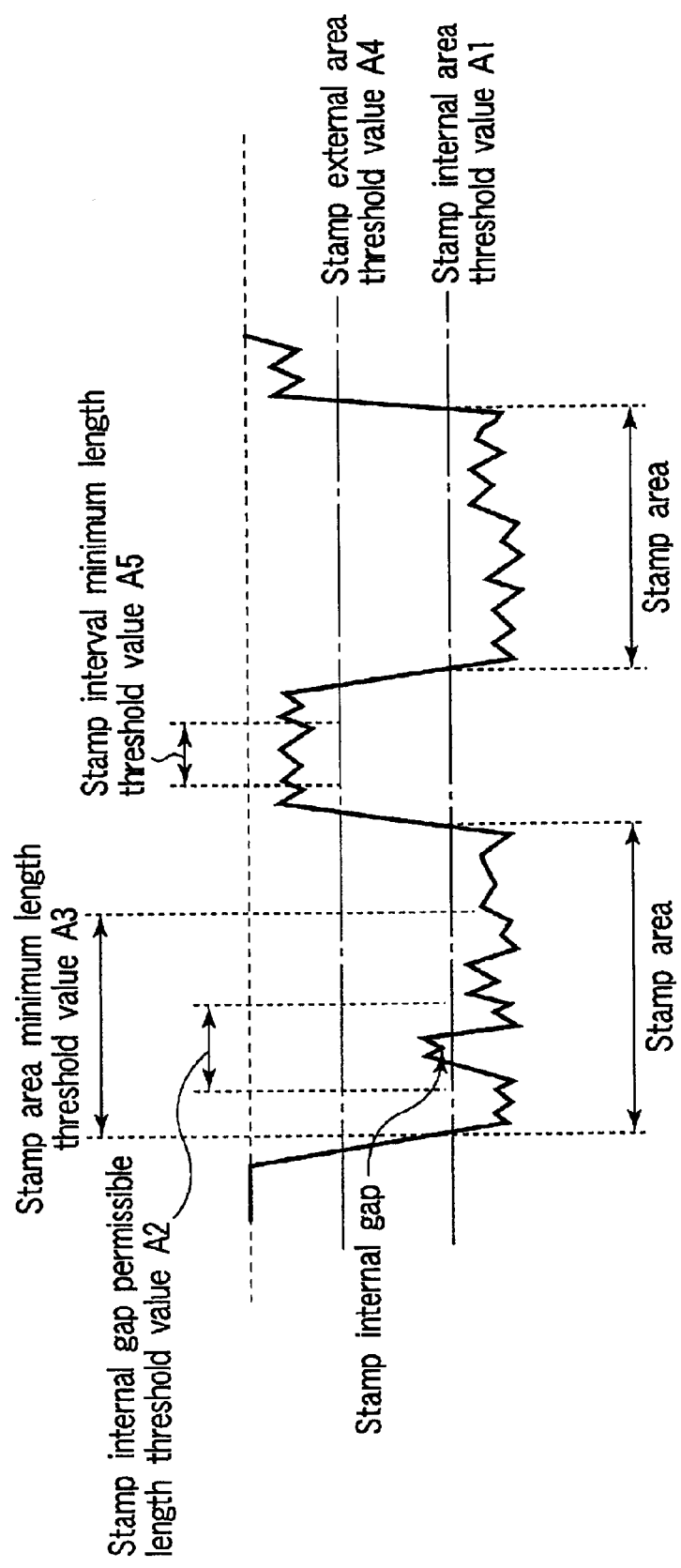
FIG. 4 is a diagram for illustrating a threshold value determining process of the stamp detecting process.

There will now be described embodiments of this invention with reference to the accompanying drawings.

First, the configuration of a first embodiment is explained.

FIG. 1 schematically shows the configuration of a letter processing apparatus to which a stamp detecting device according to the first embodiment of this invention is applied. The letter processing apparatus includes an image input section 101 which inputs an image (which is hereinafter referred to as a letter image) of a postal letter P having a stamp or stamps affixed thereto, an image memory 102 which temporarily stores an image input by the image input section 101, a stamp detecting section 103 which detects a stamp area from the letter image stored in the image memory 102, a stamp identifying section 104 which identifies the type of stamp based on the image of the stamp area detected by the stamp detecting section 103, a stamp face value determining section 105 which derives a total face value of the stamps based on the type of stamp identified by the stamp identifying section 104, a postmarking section (imprinting section) 106 which imprints a postmark on the letter P based on the coordinate value of the stamp area detected by the stamp detecting section 103, a sorting processing section (sorting section) 107 which sorts and processes the letter based on the total face value derived by the stamp face value determining section 105, a control section 108 which controls the whole portion of the which stores various data items.

With the above configuration, a flow of the schematic process is explained with reference to the flowchart shown in FIG. 2. First, the image input section 101 inputs an image of the letter P by optically scanning the letter P and photoelectrically converting the image of the letter P and stores the image into the image memory 102 (S1). The stamp detecting section 103 derives a density projection value from the letter image stored in the image memory 102 (S2) and detects a stamp area based on the thus derived projection value (S3). The coordinate value of the stamp area detected at this time is used for determining the imprinting position in the postmarking process (S4) by the postmarking section 106.

Next, the stamp identifying section 106 identifies the type of the stamp affixed to the letter P based on the image of the stamp area detected by the stamp detecting section 103 (S5). Then, the stamp face value determining section 105 determines the total face value of the stamps based on the types of the stamps identified by the stamp identifying section 104 (S6). The total face value of the stamps derived at this time is used for the sorting process (S7) for the respective types (ordinary mail, express mail and the like) of the letters P by the sorting processing section 107.

The stamp detecting section 103 detects the stamp by the following process, for example. In the following explanation, a case wherein a projection value is derived based on luminance is explained, but the same process can also be effected if a projection value is derived based on density. That is, since the luminance and density are set in an opposed relation, the density becomes lower when the luminance becomes higher and the density becomes higher when the luminance becomes lower, for example. Therefore, if the following process is effected by use of the projection value based on the density, the determination results for the threshold values will be reversed.

An outline of the stamp detecting process is shown in FIG. 3 (which will be described in detail later). In the stamp detecting process, first, a luminance projection value is derived in the lateral orientation with respect to an area in which a stamp is considered to be affixed ((1) of FIG. 3). Since the luminance of the ground area of the letter P is generally high and the luminance of the stamp area is low, it is determined that the Y coordinate of the stamp area ranges from Ys to Ye by the threshold determining process which will be described later. If a plurality of stamps are affixed in the vertical orientation, plural sets of Ys and Ye are detected, and in such a case, the following process is effected for each set of Ys and Ye.

Next, a luminance projection value is derived in the vertical orientation for a band area limited by derived Ys, Ye ((2) of FIG. 3). Also, in this case, it is determined that the X coordinate of the stamp area ranges from Xs to Xe by the threshold determination process which is similar to that in the lateral orientation. Thus, the stamp area is detected. In the postmarking section 106, the postmarking operation is effected based on the coordinate information of the stamp area thus detected.

Figure 5:
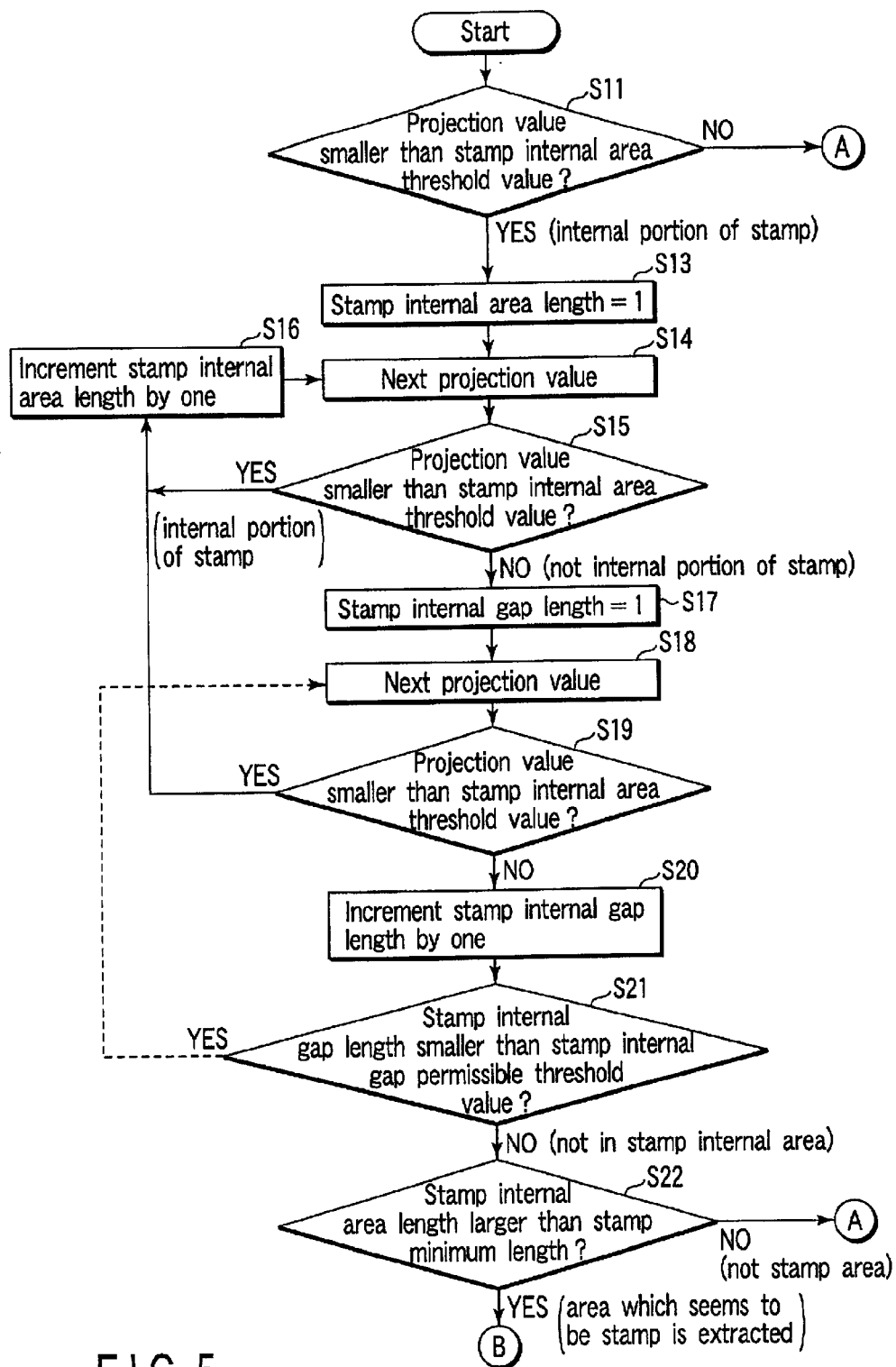
FIG. 5 is a flowchart for illustrating a flow of the stamp detecting process.
Figure 6:
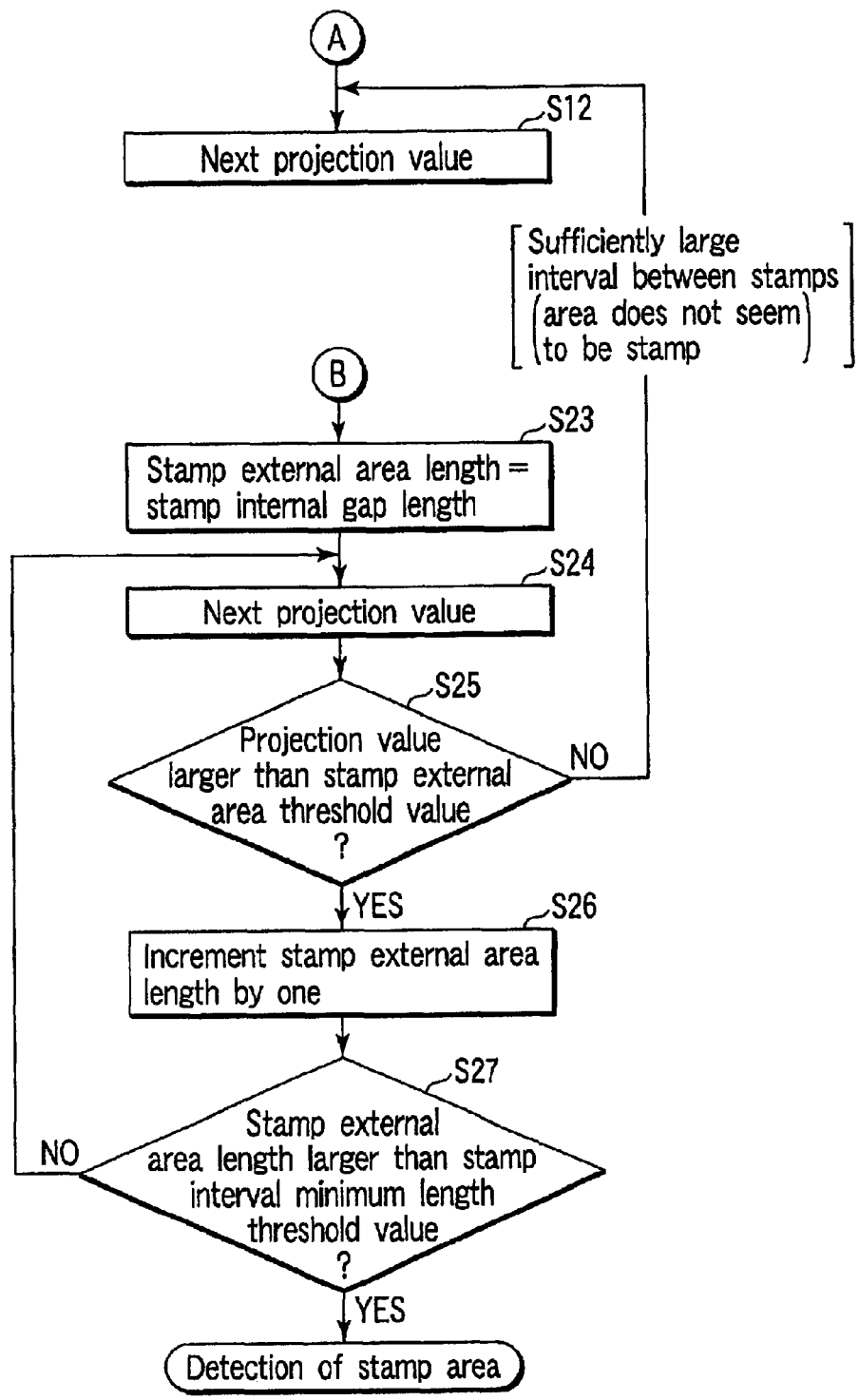
FIG. 6 is a flowchart for illustrating a flow of the stamp detecting process.

Next, the stamp area detecting process in FIG. 3 is explained in detail. The outline of the process is shown in FIG. 4 and flows of the process are shown in FIGS. 5 and 6. First, the stamp detecting section 103 determines whether or not the derived projection value is smaller than a stamp internal area threshold value A1 (S11), and if it is larger than the threshold value, the stamp detecting section determines that it is not the stamp internal portion and performs the step of checking the projection value of a next area (S12). If it is determined in the step S11 that the projection value is smaller than the threshold value A1, the stamp detecting section 103 determines that the area is the stamp internal area and sets the length of the stamp internal area to "1" (S13). Then, the stamp detecting section 103 checks whether or not the projection value of a next area is smaller than the stamp internal area threshold value A1 (S14, S15), and if the projection value is smaller than the threshold value A1, the stamp detecting section determines that it is a stamp internal portion and increments the length of the stamp internal area by one (S16).

If it is determined in the step S15 that the projection value is not smaller than the threshold value A1, the stamp detecting section 103 determines that the area does not seem to be the stamp internal area (it seems to be a stamp external portion), sets the stamp internal gap length to "1" (S17) and then performs the step of checking the projection value of a next area (S18). After this, the stamp detecting section 103 checks whether or not the projection value of a next area is smaller than the stamp internal area threshold value A1 (S19), and if the projection value is not smaller than the threshold value A1, the stamp detecting section determines that it is a stamp external portion and increments the stamp internal gap length by one (S20).

Next, the stamp detecting section 103 checks whether or not the stamp internal gap length is smaller than a stamp internal gap permissible length threshold value A2 (S21), and if the gap length is smaller than the threshold value A2, the stamp detecting section returns the process to the step S18. At this time, if it is determined in the next step S19 that the projection value of the next area is smaller than the stamp internal area threshold value A1, the stamp detecting section 103 returns the process to the step S16 again and determines that the stamp internal area is continuous.

That is, if the stamp internal gap length is equal to or smaller than the stamp internal gap permissible length threshold value A2 even in a case where it is partially determined in the steps S19, S20 that the area is a stamp external area, the stamp detecting section 103 determines that an area which may be determined as a stamp external portion is partially contained in the internal portion of the stamp and permits the existence of the area.

On the other hand, if it is determined in the step S21 that the stamp internal gap length is not smaller than the threshold value A2, the stamp detecting section 103 determines that the gap length is sufficiently large and the area is a stamp external area and performs the step S22. In the step S22, the stamp detecting section 103 checks whether the stamp internal area length incremented so far is larger than a stamp minimum length threshold value A3. If the area length is not larger than the threshold value A3, the stamp detecting section 103 determines that the area is not a sufficiently large stamp internal area (it is not a stamp) and returns the process to the step S12.

If it is determined in the step S22 that the area length is larger than the threshold value A3, the stamp detecting section 103 determines that an area which seems to be a stamp is detected and substitutes the stamp internal gap length into the stamp external area length (S23). Then, the stamp detecting section 103 performs the step of checking the projection value of a next area (S24) and checks whether the projection value is larger than a stamp external area threshold value A4 (S25). If the area is not larger than the threshold value A4, the stamp detecting section 103 determines that there is no sufficiently large stamp interval and the area does not seem to be a stamp and returns the process to the step S12 to continuously effect the searching operation.

If it is determined in the step S25 that the projection value is larger than the threshold value A4, the stamp detecting section 103 determines that the area is a stamp external area and increments the stamp external area length by one (S26). Then, the stamp detecting section 103 checks whether the stamp external area length is larger than a stamp interval minimum length threshold value A5 (S27), and if it is not larger than the threshold value A5, the stamp detecting section 103 returns the process to the step S24 to continuously effect the searching operation until a sufficiently large stamp interval is detected. If it is determined in the step S27 that the area length is larger than the threshold value A5, the stamp detecting section 103 determines that a sufficiently large stamp interval is detected and an area which really seems to be a stamp is detected and terminates the stamp detecting process.

Figure 7:
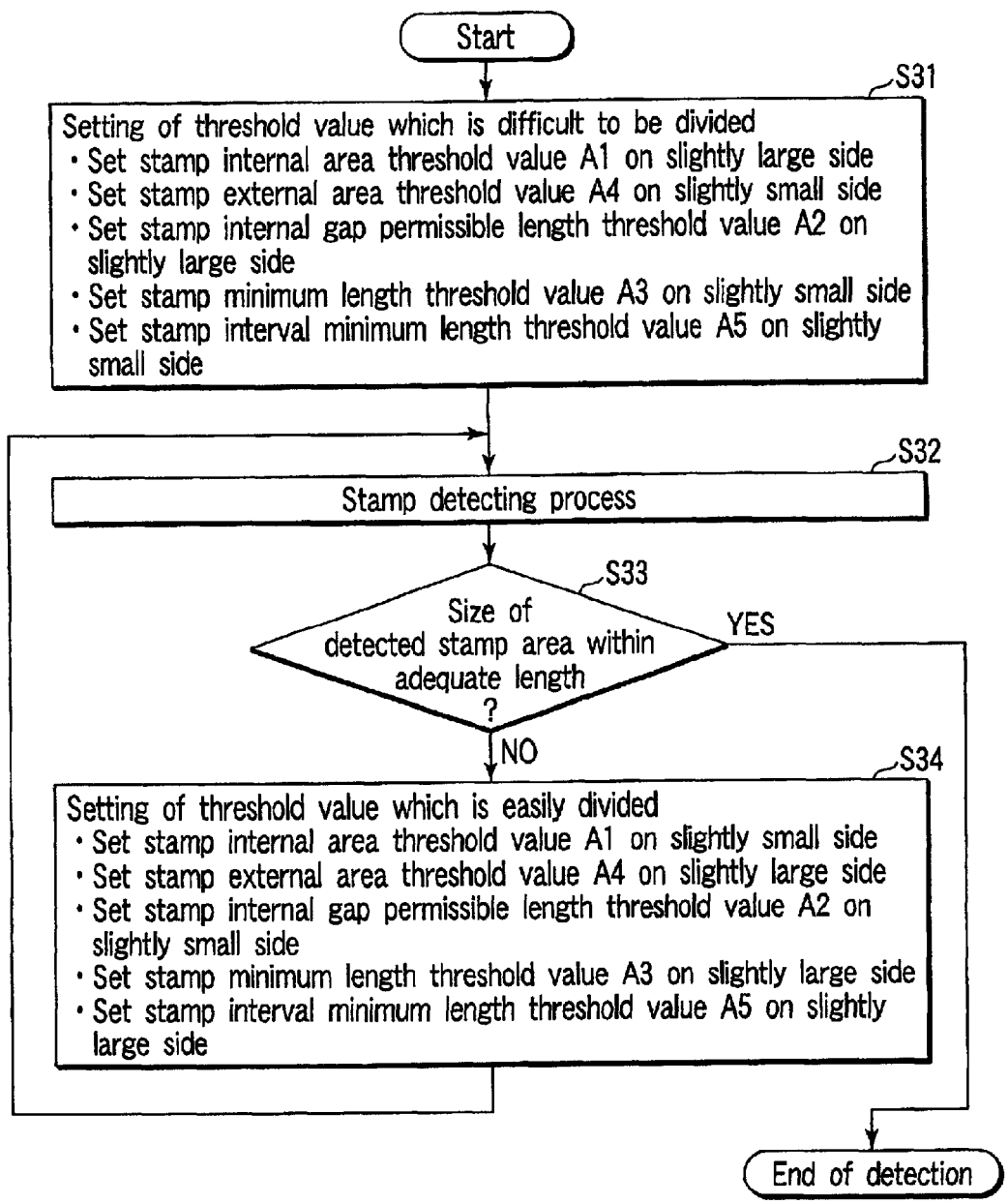
FIG. 7 is a flowchart for illustrating another flow of the stamp detecting process.

In this case, as a host process of the stamp detecting process shown in FIGS. 5 and 6, a threshold value setting process as shown by a flowchart of FIG. 7 can be used. First, the control section 108 makes rough setting of threshold values to detect a stamp (S31). More specifically, for example, the stamp internal area threshold value A1 is set to a rather large value, the stamp external area threshold value A4 is set to a rather small value, the stamp internal gap permissible length threshold value A2 is set to a rather large value, the stamp minimum length threshold value A3 is set to a rather small value, and the stamp interval minimum length threshold value A5 is set to a rather small value. Then, the stamp detecting section 103 performs the stamp detecting process under the conditions set by the control section 108 (S32).

By the above process, a large area including a plurality of stamps is temporarily detected by the rough setting of the threshold values in a case where the boundary between stamps is not clear due to stains of a letter or the printing pattern of the letter or where areas may be detected as a plurality of stamps since white portions exist in a pattern of the stamp internal portion.

Next, the control section 108 checks the length of a detected area (S33), and if it is proper length, it determines that one stamp area can be correctly detected and terminates the detecting process by the stamp detecting section 103. If it is determined in the step S33 that the length of the detected area is too long, the control section 108 slightly severely sets the threshold values (S34) so that the area can be easily divided and then starts to cause the stamp detecting section 103 to perform the stamp detecting process with respect to the internal portion of the area. Specifically, in the step S34, the stamp internal area threshold value A1 is set on the small side, the stamp external area threshold value A4 is set on the large side, the stamp internal gap permissible length threshold value A2 is set on the small side, the stamp minimum length threshold value A3 is set on the large side, and the stamp interval minimum length threshold value A5 is set on the large side, for example.

As a result, when a plurality of stamps are detected as a single combined sheet, adequate threshold values are re-set and a correct area detection process can be effected. Further, since it is not necessary to strictly set the threshold values in the first stage, it becomes easier to set the threshold values.

Figures 8, 9:
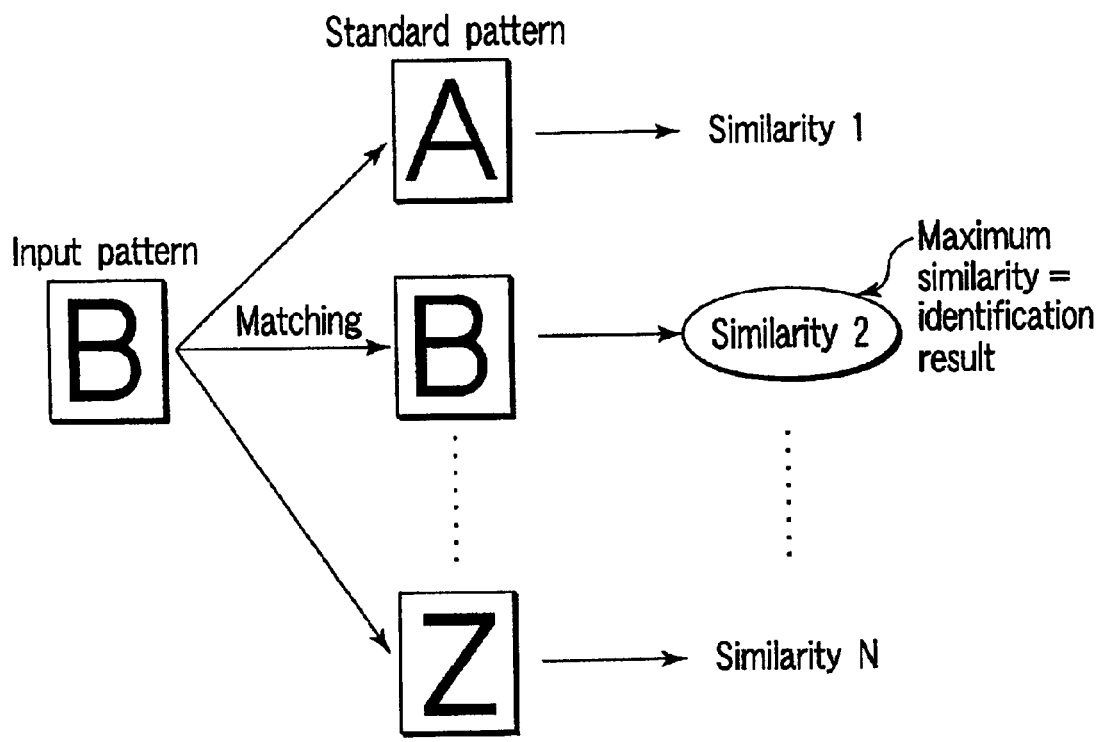
FIG. 8 is a diagram for schematically illustrating a stamp identifying process.
FIG. 9 is a diagram for illustrating an information table used for determining the stamp face value.

Next, in the stamp identifying section 104, a process for identifying the type of stamp is effected with respect to a stamp area detected by the stamp detecting section 103. For example, as shown in FIG. 8, the identifying process may be effected by previously preparing standard patterns "Template" of stamps for respective types, calculating the similarity by deriving the inner product of the standard pattern and a detected stamp area (input pattern) "Detect" and determining the type based on the magnitude of the calculated similarity. The similarity is calculated according to the following equation.

$$Similarity = \sum_{y=Y_s}^{y=Y_e} \sum_{x=X_s}^{x=X_e} Detect(x, y) * Template(x, y)$$

Various identifying methods such as a known multiple similarity method, local correlation method, partial spacing method, main component analyzing method, canonical determining/analyzing method can be used other than the above simple pattern matching method. Particularly, by using the multiple similarity method, an identification process which can cope with large variations in the pattern, such as a change or deviation in the light and shade, can be performed.

Next, the stamp face value determining section 105 determines the total face values of stamps affixed to the letter P based on type information of the stamp identified by the stamp identifying section 104 and an information table 109a which stores a table indicating a correspondence relation between the type of stamp and the face value as shown in FIG. 9.

Finally, the sorting processing section 107 sorts and processes the letter P according to the type, such as ordinary mail, express mail or the like, based on the total face value of the stamps determined by the stamp face value determining section 105.

Next, a second embodiment of this invention is explained.

The whole configuration of a letter processing apparatus according to the second embodiment is similar to that of the first embodiment (FIG. 1) except that a stamp identifying section 104 is additionally provided, as explained below. Portions similar to the first embodiment are not explained.

Figures 10, 11:
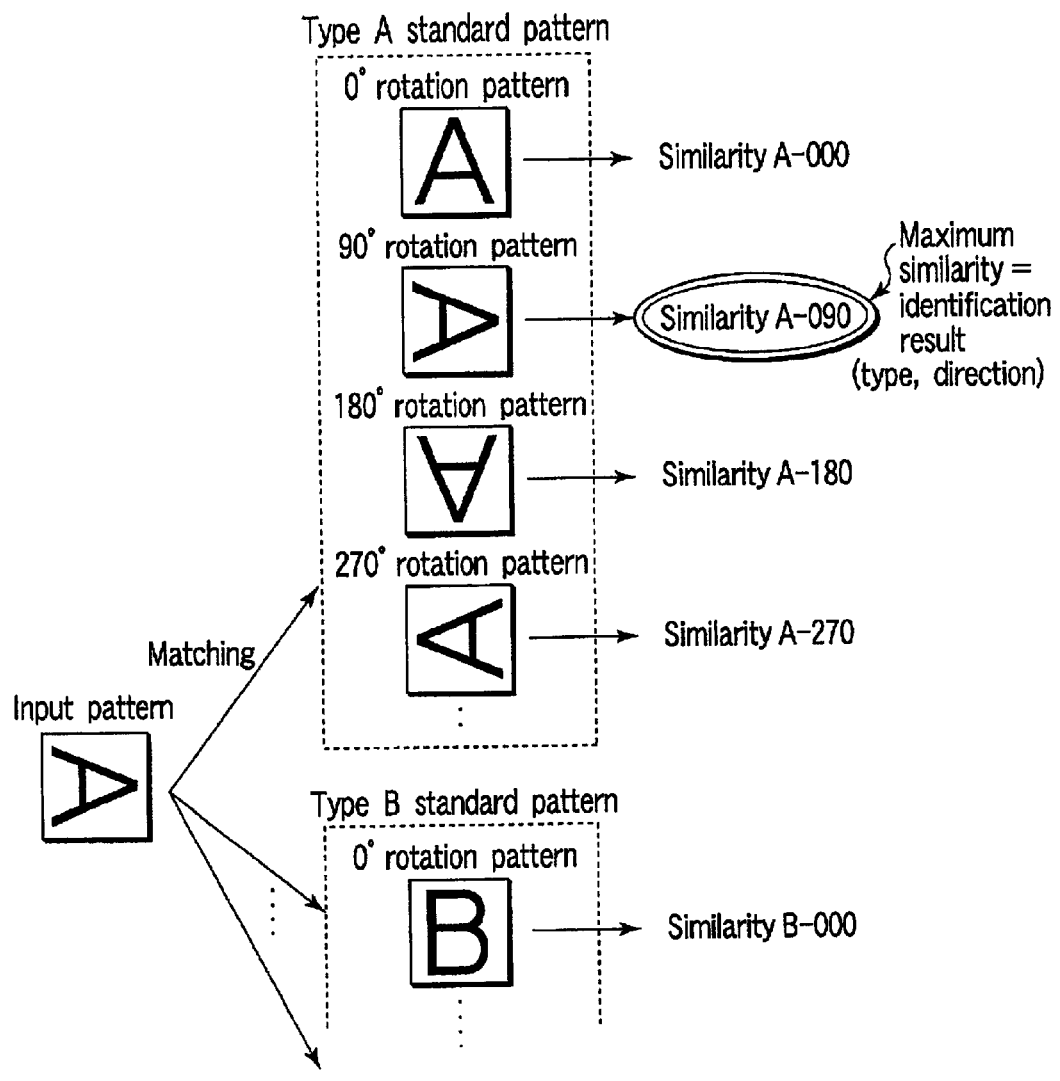
FIG. 10 is a diagram for schematically illustrating the stamp identifying process for identifying the type and affixed orientation of the stamp in a second embodiment of this invention.
FIG. 11 is a diagram for illustrating a noticed area table in a third embodiment of this invention.

As shown in FIG. 10, the stamp identifying section 104 has standard patterns (templates) corresponding to a variety of affixed stamp orientations (rotating directions) of 0°, 90°, 180°, 270° (and angles therebetween), for example, which are previously stored in the memory section 109 and derives matching degrees between the respective standard patterns and the input pattern (the pattern of the detected stamp). The type and affixed orientation of the stamp are identified by selecting the standard pattern which gives the maximum similarity or similarity larger than a threshold value based on the similarities derived by the matching process.

The orientation of the whole letter can be determined to be the same as the affixed orientation of the detected stamp. When a plurality of stamps are detected, the orientation can be determined by the average orientation of the affixed stamps. The thus detected orientation information of the letter can be used for the recognition process of the destination address of the letter or the like.

Next, a third embodiment of this invention is explained.

The whole configuration of a letter processing apparatus according to the third embodiment is similar to that of the first embodiment (FIG. 1) except that a stamp identifying section 104 is provided, as explained below. Portions similar to the first embodiment are not explained.

Generally, the patterns of stamps having different face values are similar to each other and it is difficult to distinguish them from each other in some cases. In order to clearly distinguish them, a noticed area table 109b which stores information for specifying noticed partial areas is provided in the memory section 109. More specifically, for example, as shown in FIG. 11, the noticed area table 109b which previously stores information for specifying noticed partial areas when the identification process is precisely performed is provided and the precise identification process is performed based on an area specified by the information.

Figure 12:
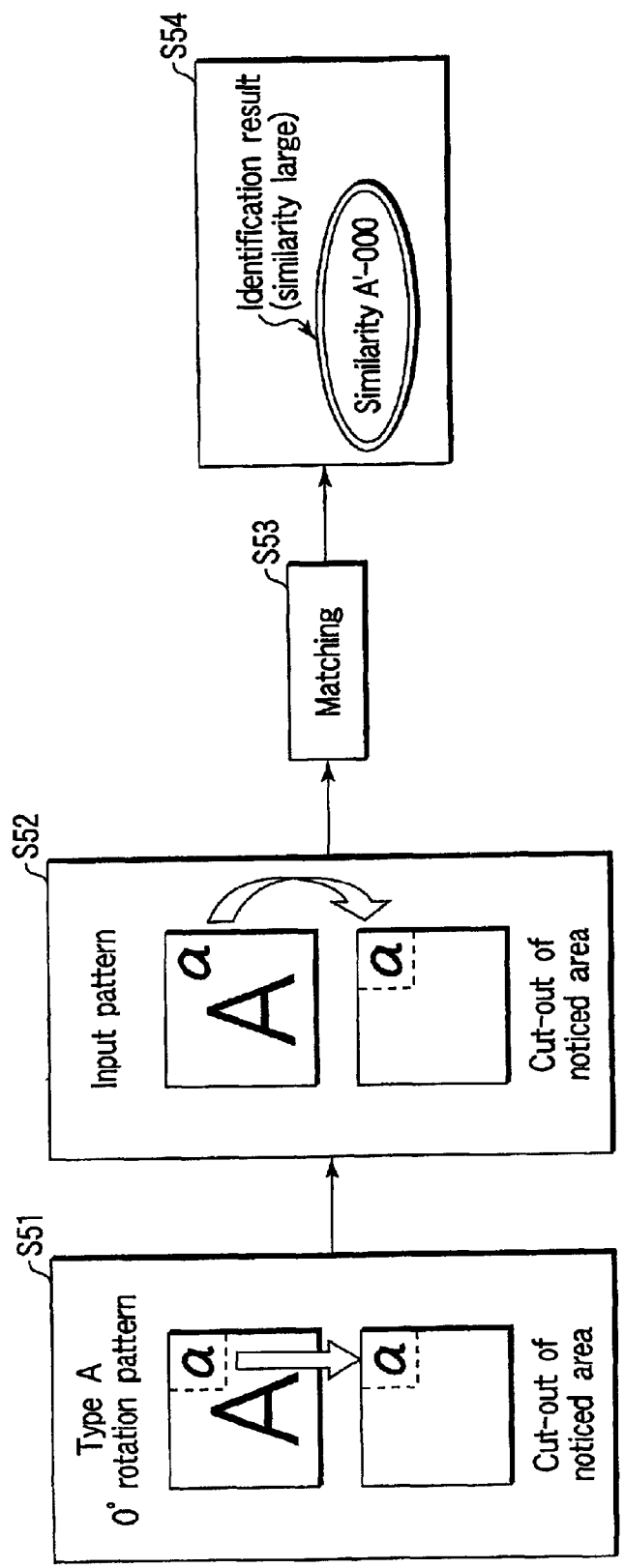
FIG. 12 is a diagram for schematically illustrating the stamp identifying process based on the affixed stamp orientation in the third embodiment.
Figure 13:
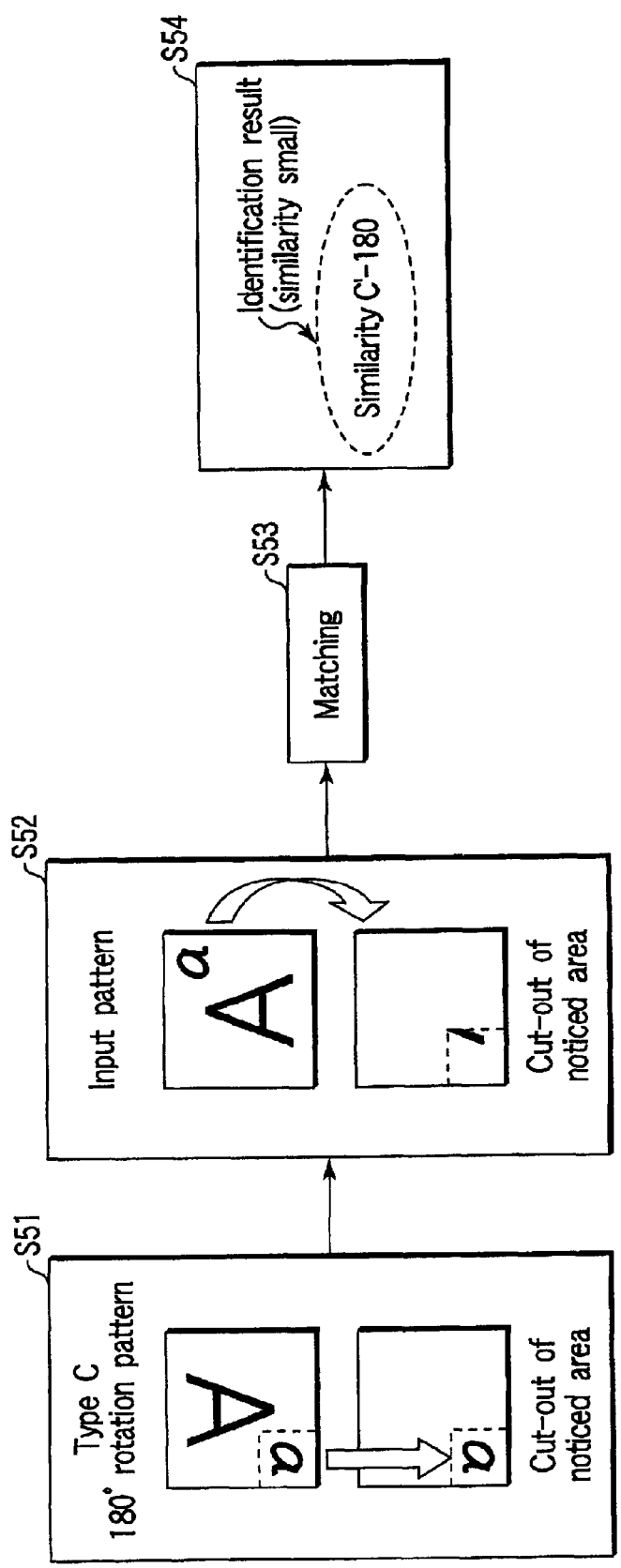
FIG. 13 is a diagram for schematically illustrating the stamp identifying process based on the affixed stamp orientation in the third embodiment.

The outline of the process is shown in FIGS. 12 and 13. In this case, an example attained by a combination of the second embodiment, in which the affixed orientation of the stamp is identified, and the present embodiment, in which the identification process is performed with high precision based on the partial area of the stamp, is explained.

First, a partial pattern of a noticed area is cut out for each identification candidate based on the noticed area table 109b of FIG. 11 and information on the affixed orientation of the stamp identified (S51). In this case, the coordinate area obtained at the time of 0° rotation is stored in the noticed area table 109b and the noticed area coordinate of the table is converted based on the affixed orientation of the detected stamp and then the partial pattern is cut out.

Likewise, a corresponding partial pattern of an input pattern is cut out (S52). Similarities can be acquired (S54) by performing an identifying process such as a matching process based on the above partial patterns (S53). A more precise identification result can be selected from the plurality of candidates by comparing the similarities.

In this case, if a price expressing figure portion of the stamp is used as the noticed area, for example, stamps of different face values having similar patterns can be precisely identified based on the difference therebetween since the similarity can be checked merely by paying attention to the price expressing figure portion.

Next, a fourth embodiment of this invention is explained.

Figures 14, 15:
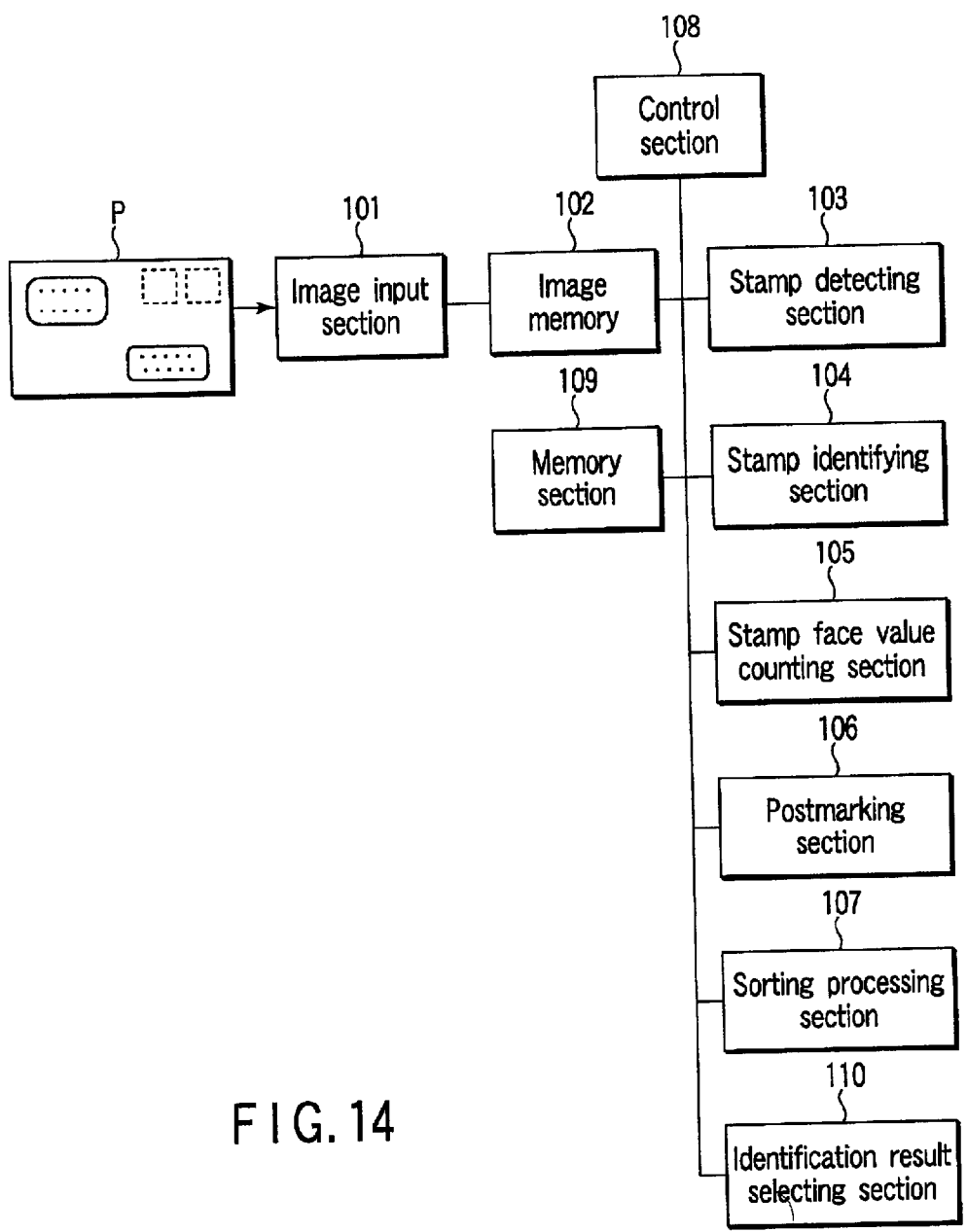
FIG. 14 is a diagram schematically showing the configuration of a letter processing apparatus according to a fourth embodiment of this invention.
FIG. 15 is a diagram for illustrating a total face value table in the fourth embodiment.

The whole configuration of a letter processing apparatus according to the fourth embodiment is shown in FIG. 14. The fourth embodiment is similar to the first embodiment (FIG. 1) except that an identification result selecting section 110 is additionally provided, as explained below. Portions similar to the first embodiment are not explained.

The postage rate is determined by the type; ordinary mail, express mail or the like, and the weight of the letter. The price patterns which can be set are limited to certain patterns. Therefore, as shown in FIG. 15, a total face value table 109c which stores the types of total face values which can be set is provided in the memory section 109 and an identification result which is not inconsistent with the total face value is selected.

Figure 16:
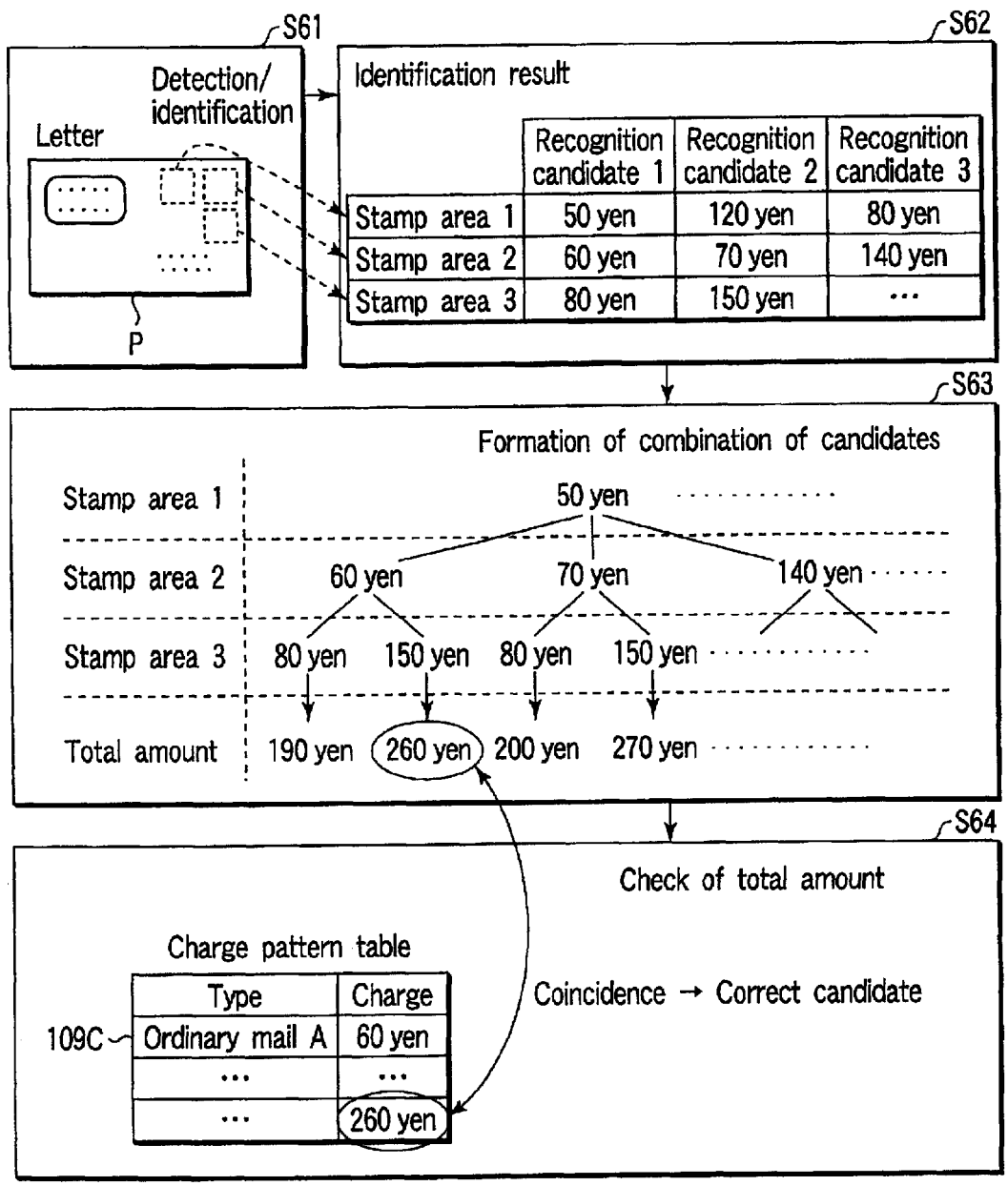
FIG. 16 is a diagram for schematically illustrating the stamp identifying process based on the total face value of the stamps in the fourth embodiment.

The outline of the process is shown in FIG. 16. The stamp identifying section 104 identifies a stamp area detected by the stamp detecting section 103 (S61). Thus, candidates of an identification result for each stamp area can be obtained (S62). Then, the total amount is calculated for a combination of a plurality of identification candidates (S63). After this, an identification result which is not inconsistent with the total face value is selected by collating the calculated total amount and the total face value patterns in the total face value table 109c of FIG. 15 (S64). Thus, a more precise identification result can be attained.

Next, a fifth embodiment of this invention is explained.

The whole configuration of a letter processing apparatus according to the fifth embodiment is similar to that of the first embodiment (FIG. 1) and the explanation thereof is omitted except for the processes which differ from that of the first embodiment.

Figure 17:
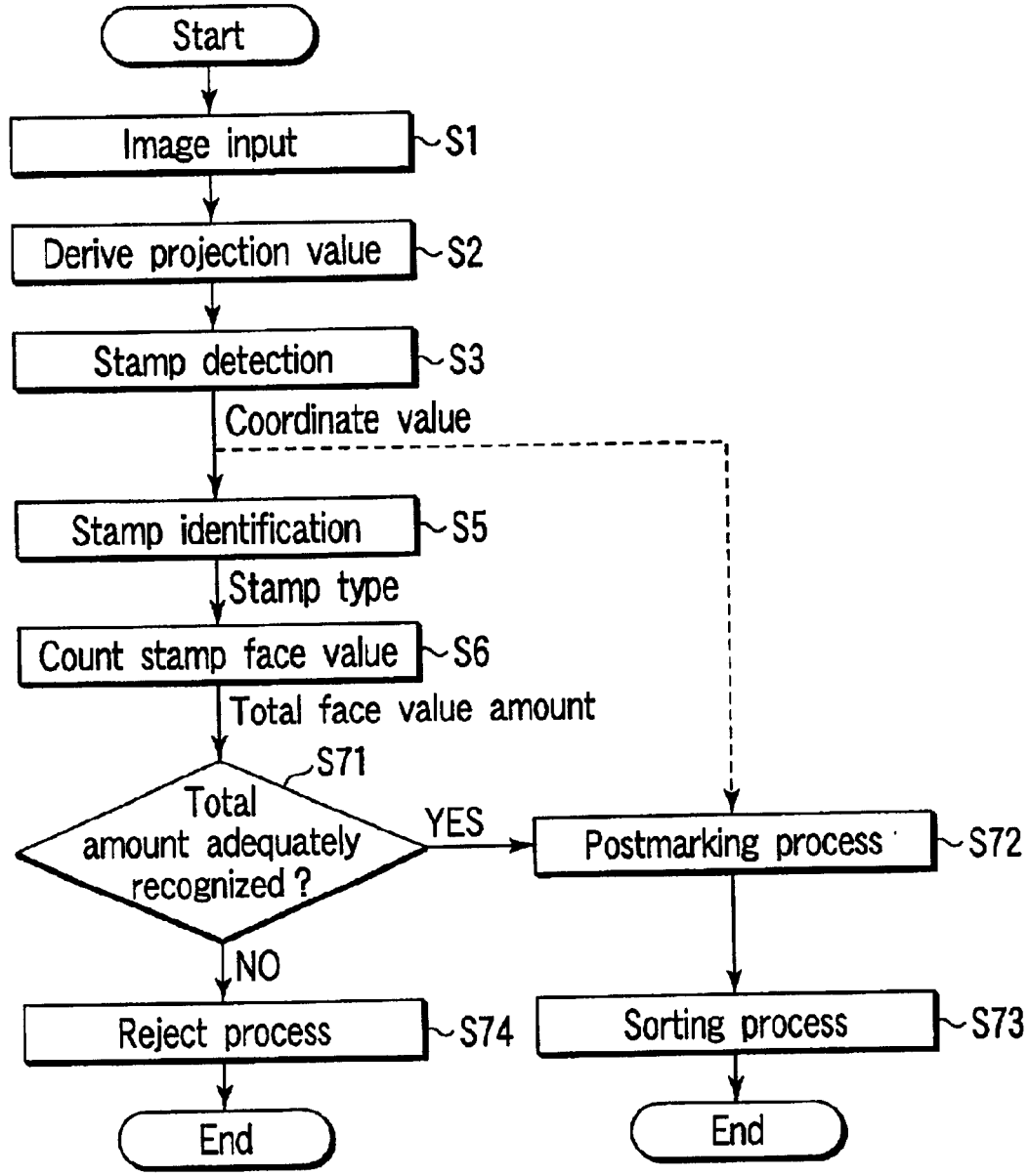
FIG. 17 is a flowchart for illustrating a flow of a schematic process in a fifth embodiment of this invention.

The flow of the process is shown in FIG. 17. Portions which are the same as those of FIG. 2 are denoted by the same reference numerals and the explanation thereof is omitted. That is, the processes such as the image input process, stamp detecting process, stamp identification process and the stamp face value determining process are effected in the same manner as in the first embodiment (the steps S1, S2, S4, S5, S6 in FIG. 2).

After this, whether or not the stamp face value determining process is correctly effected is checked (S71), and only if the stamp face value determining process is correctly effected, a postmarking process (S72) and sorting process (S73) are effected. If the stamp face value determining process is not correctly effected, a process for separately sorting the letter is effected as the result of process failure, for example, and then a reject process (S74) is effected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stamp detecting device comprising:
   an image input section which inputs an image of a letter having at least one stamp affixed thereto; and
   a stamp detecting section which (i) discriminates at least one area seeming to be the stamp from another area based on the input image, and (ii) detects as a stamp area, an area that includes two or more areas seeming to be the stamp along with said another area, if said another area is located between the two or more areas and has a size falling within a preset permissable range.

2. The stamp detecting device according to claim 1, wherein said stamp detecting section discriminates an internal area of the stamp from said another area based on a stamp internal area threshold value set with respect to a projection value of one of density and luminance of the input image, detects, as the stamp area, the internal area and an area adjacent thereto that is detected not to be the internal area, if the area adjacent to the internal area and detected not to be the internal area has a size falling within a permissible gap range, and detects the internal area as the stamp area if the area adjacent to the internal area and detected not to be the internal area has a size falling out of the permissible gap value.

3. The stamp detecting device according to claim 1, further comprising a control section which changes one of a stamp internal area threshold value and a permissible gap range and causes said stamp detecting section to again perform stamp detection, if the detected area for the stamp does not have an appropriate size.

4. A letter processing apparatus comprising:
   an image input section which inputs an image of a letter having at least one stamp affixed thereto;
   a stamp detecting section which (i) discriminates at least one area seeming to be the stamp from another area based on the input image, and (ii) detects, as an area for the stamp, an area that includes two or more areas seeming to be the stamp along with said another area, if said another area is held between the two or more areas and has a size falling within a preset permissible range;
   a stamp identifying section which identifies a type of the stamp detected by said stamp detecting section;
   a stamp face value calculating section which derives a total face value of the stamps affixed to the letter based the type of stamp identified by said stamp identifying section; and
   a sorting section which sorts the letter based on the total face value of the stamps derived by said stamp face value calculating section.

5. The letter processing apparatus according to claim 4, wherein said stamp detecting section discriminates an internal area of the stamp from said another area based on a stamp internal area threshold value set with respect to a projection value of one of a density and luminance of the input image;

detects, as the area for the stamp, the internal area and an area adjacent thereto and detected not to be the internal area, if the area adjacent to the internal area and detected not to be the internal area has a size falling within a permissible gap range; and detects the internal area as the area for the stamp if the area adjacent to the internal area and detected not to be the internal area has a size falling out of the permissible gap value.

6. The letter processing apparatus according to claim 4, further comprising a control section which changes one of a stamp internal area threshold value and a permissible gap range and causes said stamp detecting section to again perform stamp detection, if the detected area for the stamp does not have an appropriate size.

7. A letter processing apparatus comprising:
   an image input section which inputs an image of a letter having at least one stamp affixed thereto;
   a stamp detecting section which detects a stamp affixed to the letter based on one of a density projection value and luminance projection value derived according to the image input by said image input section;
   a stamp identifying section which identifies a type and affixed orientation of the stamp by collating a pattern of the stamp detected by said stamp detecting section with a plurality of standard patterns previously prepared for respective rotational positions of the stamp;

a stamp face value determining section which derives a total face value of the stamps affixed to the letter based on the type of the stamp identified by said stamp identifying section; and a sorting section which sorts the letter based on the total face value of the stamps derived by said stamp face value determining section.

8. The letter processing apparatus according to claim 4, which further comprises a memory section which previously stores noticed area specifying information used for specifying a noticed partial area at the time of identification of the stamp by said stamp identifying section and in which said stamp identifying section identifies the type of stamp by collating a pattern of the stamp detected by said stamp detecting section with a plurality of previously prepared standard patterns only in a partial area specified by the noticed area specifying information stored in said memory section.

9. A letter processing apparatus comprising:

an image input section which inputs an image of a letter having at least one stamp affixed thereto;

a stamp detecting section which detects a stamp affixed to the letter based on one of a density projection value and luminance projection value derived according to the image input by said image input section;

a stamp identifying section which identifies an affixed orientation of the stamp detected by said stamp detecting section, changes the orientation of the noticed partial area based on the identified affixed orientation and then identifies a type of the stamp;

a stamp face value determining section which derives a total face value of the stamps affixed to the letter based on the type of the stamp identified by said stamp identifying section; and a sorting section which sorts the letter based on the total face value of the stamps derived by said stamp face value determining section.

10. The letter processing apparatus according to claim 4, which further comprises a memory section which previously stores types of total face values of permissible stamps; and a total face value determining section which determines a total face value of stamps by collating total face value amounts stored in said memory section with a total face value derived by said stamp face value determining section and in which said sorting section sorts the letter based on the total face value determined by said total face value determining section.

11. The letter processing apparatus according to claim 4, which further comprises a determining section which determines whether the total face value derived by said stamp face value determining section is adequate or not and an imprinting section which postmarks the letter based on position information of the stamp detected by said stamp detecting section when it is determined by said determining section that the total face value derived by said stamp face value determining section is adequate and in which said sorting section sorts the letter based on the total face value of the stamps derived by said stamp face value determining section when it is determined by said determining section that the total face value derived by said stamp face value determining section is adequate.

12. A stamp detecting method comprising:

inputting an image of a letter having at least one stamp affixed thereto; and discriminating, in the input image, at least one area seeming to be the stamp from another area; and detecting, as an area for the stamp, an area that includes two or more areas seeming to be the stamp and said another area, if said another area is held between the two or more areas and has a size falling within a preset permissible range.

13. A letter processing method comprising:

inputting an image of a letter having at least one stamp affixed thereto;

discriminating, in the input image, at least one area seeming to be the stamp from another area; and detecting, as an area for the stamp, an area that includes two or more areas seeming to be the stamp and said another area, if said another area is held between the two or more areas and has a size falling within a preset permissible range;

identifying a type of the stamp in the detected area;

deriving a total face value of the stamps affixed to the letter based on the type of the stamp identified by said identifying; and sorting the letter based on the total face value of the stamps derived by said deriving.

14. The letter processing method according to claim 13, wherein said discriminating includes discriminating the at least one area seeming to be the stamp from said another area, based on a threshold value set with respect to a projection value of one of a density and luminance of the input image.

15. A letter processing method comprising:

inputting an image of a letter having at least one stamp affixed thereto;

detecting a stamp affixed to the letter based on one of a density projection value and luminance projection value derived from the input image;

identifying a type and affixed orientation of the detected stamp by collating a pattern of the detected stamp with a plurality of standard patterns previously prepared for respective rotational positions of the stamp;

deriving a total face value of the stamps affixed to the letter based on the type of the stamp thus identified; and sorting the letter based on the thus derived total face value of the stamps.

16. The letter processing method according to claim 13, wherein said identifying includes identifying a type of the stamp by collating a pattern of the detected stamp with a plurality of previously prepared standard patterns only in a partial area specified by noticed area specifying information previously stored in a memory section and used for specifying a noticed partial area at the time of identification.

17. A letter processing method comprising:

inputting an image of a letter having at least one stamp affixed thereto;

detecting a stamp affixed to the letter based on one of a density projection value and luminance projection value derived from the input image;

identifying an affixed orientation of the detected stamp, changing the orientation of the noticed partial area based on the identified affixed orientation and then identifying a type of the stamp;

deriving a total face value of the stamps affixed to the letter based on the type of the stamp thus identified; and sorting the letter based on the thus derived total face value of the stamps.

18. The letter processing method according to claim 13, which further comprises determining a total face value of stamps by collating total face value amounts determined based on the types of permissible total face value amounts of the stamps previously stored in a memory section with a total face value derived by said determining and in which said sorting includes sorting the letter based on the total face value determined by said determining.

19. The letter processing method according to claim 13, which further comprises determining whether the total face value of the stamps derived by said determining is adequate or not and postmarking the letter based on position information of the stamp detected by said detecting when it is determined by said determining that the total face value derived by said determining is adequate and in which said sorting includes sorting the letter based on the total face value of the stamps derived by said determining when it is determined by said determining that the total face value of the stamps derived by said determining is adequate.

* * * * *